United States Patent
Zhong et al.

(10) Patent No.: US 12,450,695 B1
(45) Date of Patent: Oct. 21, 2025

(54) PHASE RECONSTRUCTION METHODS FOR DIFFERENTIAL INTERFERENCE CONTRAST MICROSCOPY BASED ON PIX2PIX NETWORK

(71) Applicant: GUANGDONG UNIVERSITY OF TECHNOLOGY, Guangdong (CN)

(72) Inventors: Liyun Zhong, Guangzhou (CN); Yuheng Wang, Guangzhou (CN); Weina Zhang, Guangzhou (CN); Tao Huang, Guangzhou (CN); Huiyang Wang, Guangzhou (CN); Jianglei Di, Guangzhou (CN); Yuwen Qin, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/238,324

(22) Filed: Jun. 13, 2025

(30) Foreign Application Priority Data

Oct. 23, 2024 (CN) .......................... 202411482479.7

(51) Int. Cl.
*G06T 5/60* (2024.01)
*G02B 21/36* (2006.01)
(Continued)

(52) U.S. Cl.
CPC .............. *G06T 5/60* (2024.01); *G02B 21/365* (2013.01); *G06T 5/70* (2024.01); *G06T 11/00* (2013.01); *G06T 2207/10056* (2013.01); *G06T 2207/20048* (2013.01); *G06T 2207/20081* (2013.01); *G06T 2207/20084* (2013.01)

(58) Field of Classification Search
CPC ............ G06T 5/60; G06T 2207/10056; G02B 21/365
See application file for complete search history.

(56) References Cited

U.S. PATENT DOCUMENTS

2021/0325308 A1* 10/2021 Kannan .............. G01N 21/6458

FOREIGN PATENT DOCUMENTS

CN     108303020 A    7/2018
CN     109581645 A    4/2019
(Continued)

OTHER PUBLICATIONS

Hui, Mei et al., The Manufacture of a Phase Stepping Differential Interference Contrast Microscopy Measuring System, Journal of Optoelectronics Laser, 13(11): 1141-1144, 2002.
(Continued)

*Primary Examiner* — Matthew Salvucci
(74) *Attorney, Agent, or Firm* — PORUS IP LLC (57) ABSTRACT

The present disclosure of some embodiments provide a phase reconstruction method for differential interference contrast microscopy based on a pix2pix network, the method comprising the following steps: S1, constructing an end-to-end deep learning strategy based on the pix2pix network; S2, collecting and constructing dataset; S3, Training the pix2pix network; S4, analyzing network accuracy and convergence, and recording error curves of the datasets; S5, analyzing network performance based on error curves of the training set and the test set; S6, performing quantitative phase reconstruction for differential interference contrast microscopy using the trained pix2pix network.

5 Claims, 7 Drawing Sheets

(51) Int. Cl.
*G06T 5/70* (2024.01)
*G06T 11/00* (2006.01)

(56) References Cited

FOREIGN PATENT DOCUMENTS

| | | |
|---|---|---|
| CN | 116147531 A | 5/2023 |
| CN | 117876530 A | 4/2024 |
| EP | 1127252 B1 | 3/2005 |

OTHER PUBLICATIONS

Notification to Grant Patent Right for Invention in Chinese Application No. 202411482479.7 mailed on Apr. 25, 2025, 5 pages.

\* cited by examiner

PHASE RECONSTRUCTION METHODS FOR DIFFERENTIAL INTERFERENCE CONTRAST MICROSCOPY BASED ON PIX2PIX NETWORK

CROSS-REFERENCE TO RELATED APPLICATIONS

This application claims priority to Chinese Patent Application No. 202411482479.7, entitled "phase reconstruction methods for differential interference contrast microscopy based on pix2pix network," filed on Oct. 23, 2024, the entire content of which is incorporated herein by reference.

TECHNICAL FIELD

The present disclosure relates to the field of optical differential interference contrast technologies, and in particular, to phase reconstruction methods for differential interference contrast microscopy based on a pix2pix network.

BACKGROUND

Differential interference contrast (DIC) microscopy is an optical microscopy technology configured to enhance the contrast of transparent samples, enabling clear structural visualization of the transparent samples without staining. The DIC microscopy is based on shear interference of coherent light and indirectly records physical properties of a sample by mapping gradients of the optical path length to the image intensity, thereby making the system highly sensitive to subtle phase gradients. Due to the advantages of high contrast, high resolution, and optical sectioning capability, optical DIC microscopy has been widely applied in fields such as biology, materials science, and cytology. Optical DIC microscopy is particularly suitable for observing transparent samples, such as cells, tissue sections, microorganisms, and polymer films. In live-cell imaging, DIC has become a primary research tool because it provides high-contrast images without the need for staining.

SUMMARY

One or more embodiments of the present disclosure provide a phase reconstruction method for DIC microscopy based on a pix2pix network. The method comprises: S1: constructing an end-to-end deep learning strategy based on the pix2pix network, wherein the pix2pix network includes a generator and a discriminator, each of the generator and the discriminator includes an input channel and an output channel; S2: based on phase shifts with an equal-step and a fixed-step, collecting digital holographic phase-shift interferograms of 5,000 groups of samples including Hela cells and polystyrene microspheres to generate ground-truth phases for network training and determine differential phases based on a preset shear amount and a preset shear direction; constructing 5,000 groups of datasets including the differential phases and the ground-truth phases, wherein 4,000 groups of datasets are used as a training set for network training, and 1,000 groups of datasets are used as a test set for network testing, the differential phases serve as inputs, and the ground-truth phases serve as labels; S3: training the pix2pix network, wherein the differential phases $\Delta\varphi(r)$ in the training set are used as inputs, the ground-truth phases $\varphi(r)$ in the training set are used as labels; during a network training process, a loss function combining an adversarial loss and a similarity loss is used to determine a difference between a network output and its corresponding label, and gradient descent is employed to optimize network parameters; S4: improving the ability of the pix2pix network to generate accurate phase reconstruction maps through network training, wherein a goal of the network training process is to make the loss function converge, and the network parameters or an architecture of the pix2pix network are adjusted when the loss function does not converge during the network training process; during the network training process, the training set and the test set are input alternately to record their error curves for analyzing network accuracy and convergence; S5: analyzing network performance based on the error curves of the training set and the test set; and optimizing the network parameters and the loss function based on analysis results of the network accuracy and the convergence; S6: performing quantitative phase reconstruction for DIC microscopy using the trained pix2pix network, including acquiring target DIC images with phase shifts of 0, $\pi/2$, $\pi$, and $3\pi/2$ through a DIC microscope, quantitatively recovering a target differential phase $\Delta\varphi(r)'$ from the target DIC images using a four-step phase-shifting algorithm, and inputting the recovered target differential phase $\Delta\varphi(r)'$ into the pix2pix network to obtain a target phase $\varphi(r)'$.

BRIEF DESCRIPTION OF THE DRAWINGS

The present disclosure will be further described by way of exemplary embodiments, which are described in detail with reference to the accompanying drawings. These embodiments are not intended to be limiting. In the embodiments, the same reference numerals refer to the same structures, wherein.

DETAILED DESCRIPTION

In order to more clearly illustrate the technical solutions of the embodiments of the present disclosure, a brief introduction of the drawings required in the description of the embodiments is provided below. It is apparent that the drawings described below are merely some examples or embodiments of the present disclosure. Those skilled in the art can apply the present disclosure to other similar scenarios without creative efforts based on these drawings. Unless otherwise indicated or obvious from the context, identical reference numerals in the figures refer to the same structures or operations.

It should be understood that the terms "system," "device," "unit," and/or "module" used herein are intended as a way to distinguish between different levels of components, elements, parts, sections, or assemblies. However, if other terms can serve the same purpose, such terms may be used as alternatives.

As used in the present disclosure and the claims, unless expressly indicated otherwise by the context, the terms "a," "an," "one," and/or "the" are not limited to singular forms and may also encompass plural forms. In general, the terms "include" and "contain" merely indicate the presence of the explicitly identified steps or elements, and such steps or elements are not intended to be exhaustive. A method or device may also include other steps or elements.

Flowcharts are used in the present disclosure to illustrate operations performed by systems according to the embodiments of the present disclosure. It should be understood that the operations described earlier or later are not necessarily executed in the exact sequence shown. Instead, the steps may be performed in reverse order or in parallel. Additionally, other operations may be added to or removed from these processes.

According to a geometrical optical imaging model, a DIC image is formed by the coherent superposition of copies of two image field (i.e., $u(r)$ and $u(r+\delta r)$) with a spatial displacement, and the image intensity of the DIC image may be expressed by Equation (1):

$$I_n(r)=|u(r)+u(r+\delta r)|^2=|u(r)|^2+|u(r+\delta r)|^2+2|u(r)||u(r+\delta r)|\cos(\varphi(r+\delta r)-\varphi(r)+\theta_n), \quad (1)$$

wherein $|u(r)|^2$ and $\varphi(r)$ represent the intensity and the phase of the image field, respectively, $\delta r$ represents a spatial displacement introduced between the two image fields by a Wollaston prism in a DIC microscope, and the spatial displacement is typically smaller than an Airy disk diameter of the system. A phase retarder introduces a phase delay $\theta_n = n\pi/2$ ($n=0, 1, 2, 3$) to one image field, while the other image field remains unchanged. Based on four DIC images (also referred to as four intensity images), a differential phase $\Delta\varphi(r)$ along the displacement direction of the sample may be determined.

As shown in Equation (2), a relationship between a ground-truth phase $\varphi(r)$ of the sample and a differential phase $\Delta\varphi(r)$ obtained using the DIC microscope is as follows:

$$\Delta\varphi(r)=\varphi(r+\delta r)-\varphi(r). \quad (2)$$

Therefore, the DIC microscopy is capable of converting subtle refractive index differences in transparent samples into intensity contrast, significantly enhancing the visibility of the samples. DIC microscopy is highly sensitive to small phase gradients. Due to its common-path system and phase shearing, the DIC system exhibits better vibration resistance and lower system noise.

Although DIC microscopy has achieved significant success and has been widely applied, some limitations still exist. One of the limitations is that the intensity images of the DIC microscopy exhibit a nonlinear relationship with the optical path length gradient of the sample along the shearing direction, which makes it extremely challenging to reconstruct, from DIC images, quantitative phase images that are directly related to original physical properties of the sample, such as refractive index, thickness, or optical path length.

On one hand, linear integration methods have been developed for phase reconstruction of DIC images based on the imaging model of DIC. However, during line-by-line integration along the shearing direction, serious directional artifacts may arise in the reconstructed image due to unknown integration constants, noise accumulation, and amplification of low-frequency noise. On the other hand, acquiring multiple DIC images with different shearing directions enables the retrieval of complete boundary information of the sample, which can significantly improve phase reconstruction accuracy and robustness. Typically, obtaining DIC images with different shearing directions requires rotating the sample or the shearing prism, which may introduce misalignment or defocus that needs to be further corrected. Accordingly, achieving artifact-free and dynamic phase reconstruction with high accuracy remains a challenge for the DIC microscopy. Therefore, a phase reconstruction method for DIC microscopy based on a pix2pix network is urgently needed to achieve high-accuracy phase reconstruction and enhance the realism and stability of DIC images.

Figure 1:
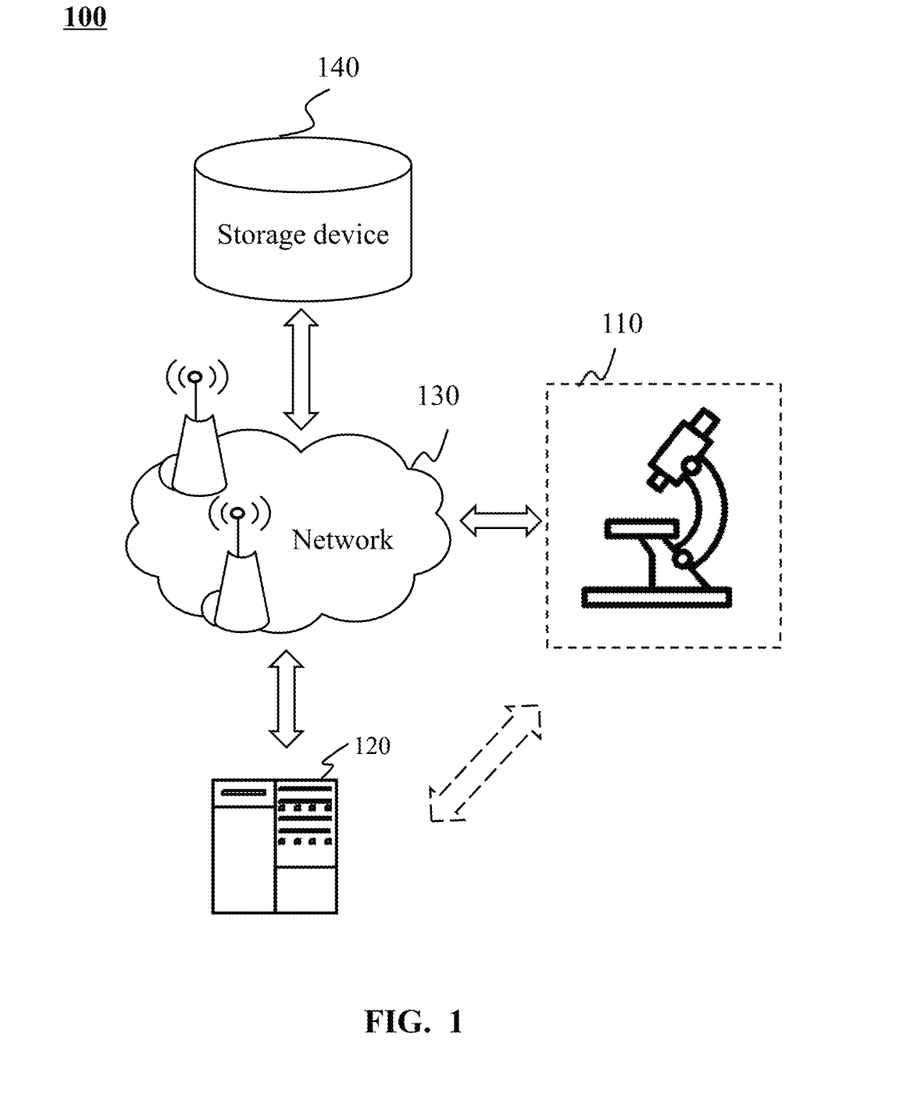
FIG. 1 is a schematic diagram illustrating an optical microscopy system according to some embodiments of the present disclosure.

FIG. 1 is a schematic diagram illustrating an optical microscopy system according to some embodiments of the present disclosure. As shown in FIG. 1, an optical microscopy system 100 (hereinafter referred to as a system 100) may include a DIC microscope 110, a processing device 120, a network 130, and a storage device 140. Components of the optical microscopy system 100 may be connected in one or more ways. Merely by way of example, as shown in FIG. 1, the DIC microscope 110 may be connected to the processing device 120 via the network 130. As another example, the DIC microscope 110 may be directly connected to the processing device 120, as indicated by the dashed bidirectional arrow between the DIC microscope 110 and the processing device 120.

The DIC microscope 110 refers to an optical microscopy system configured with DIC imaging functionality. For example, the DIC microscope may include optical imaging components (e.g., a polarized light source, a beam-splitting prism, and an interference prism), a stage, an image acquisition device, and a controller. In some embodiments, the controller may be configured to receive movement commands sent from the processing device 120 via the network 130, so as to control the stage of the DIC microscope to adjust a position of a sample. More descriptions may be found in FIG. 2 and related descriptions thereof.

The processing device 120 may be configured to process data and/or information from various components of the optical microscopy system 100 and/or from external data sources. The processing device 120 may execute program instructions based on the data, the information, and/or the processing results, so as to perform one or more functions described in the present disclosure. For example, the processing device 120 may be configured to train a pix2pix network, or may analyze network performance based on error curves of a training set and a test set.

In some embodiments, the processing device 120 may be a single server or a server cluster. In some embodiments, the server may include a processor, and the server cluster may be centralized or distributed. In some embodiments, the processing device 120 may be local or remote. In some embodiments, the processing device 120 may be implemented on a cloud platform. Merely by way of example, the cloud platform may include a private cloud, a public cloud, a hybrid cloud, or any combination thereof.

The network 130 may include any suitable network configured to facilitate exchange of information and/or data for the optical microscopy system 100. In some embodiments, one or more components of the optical microscopy system 100 (e.g., the DIC microscope 110, the processing device 120, or the storage device 140) may communicate information and/or data with one or more other components of the optical microscopy system 100 via the network 130. In some embodiments, the network 130 may include a wired network and/or a wireless network.

The storage device 140 may be configured to store data, instructions, and/or any other information. In some embodiments, the storage device 140 may store data acquired from the DIC microscope 110 and/or the processing device 120. For example, the storage device 140 may store differential phases and ground-truth phases. In some embodiments, the storage device 140 may include a mass storage device, a removable storage device, a volatile read-write memory, a read-only memory (ROM), or any combination thereof. In some embodiments, the storage device 140 may be implemented on a cloud platform. In some embodiments, the storage device 140 may be connected to the network 130 to communicate with one or more other components of the optical microscopy system 100 (e.g., the DIC microscope 110 or the processing device 120). One or more components of the optical microscopy system 100 may access data or instructions stored in the storage device 140 via the network 130. In some embodiments, the storage device 140 may be directly connected to or communicate with one or more other components of the optical microscopy system 100 (e.g., the DIC microscope 110, the processing device 120, or the storage device 140). In some embodiments, the storage device 140 may be a part of the processing device 120.

Figure 2:
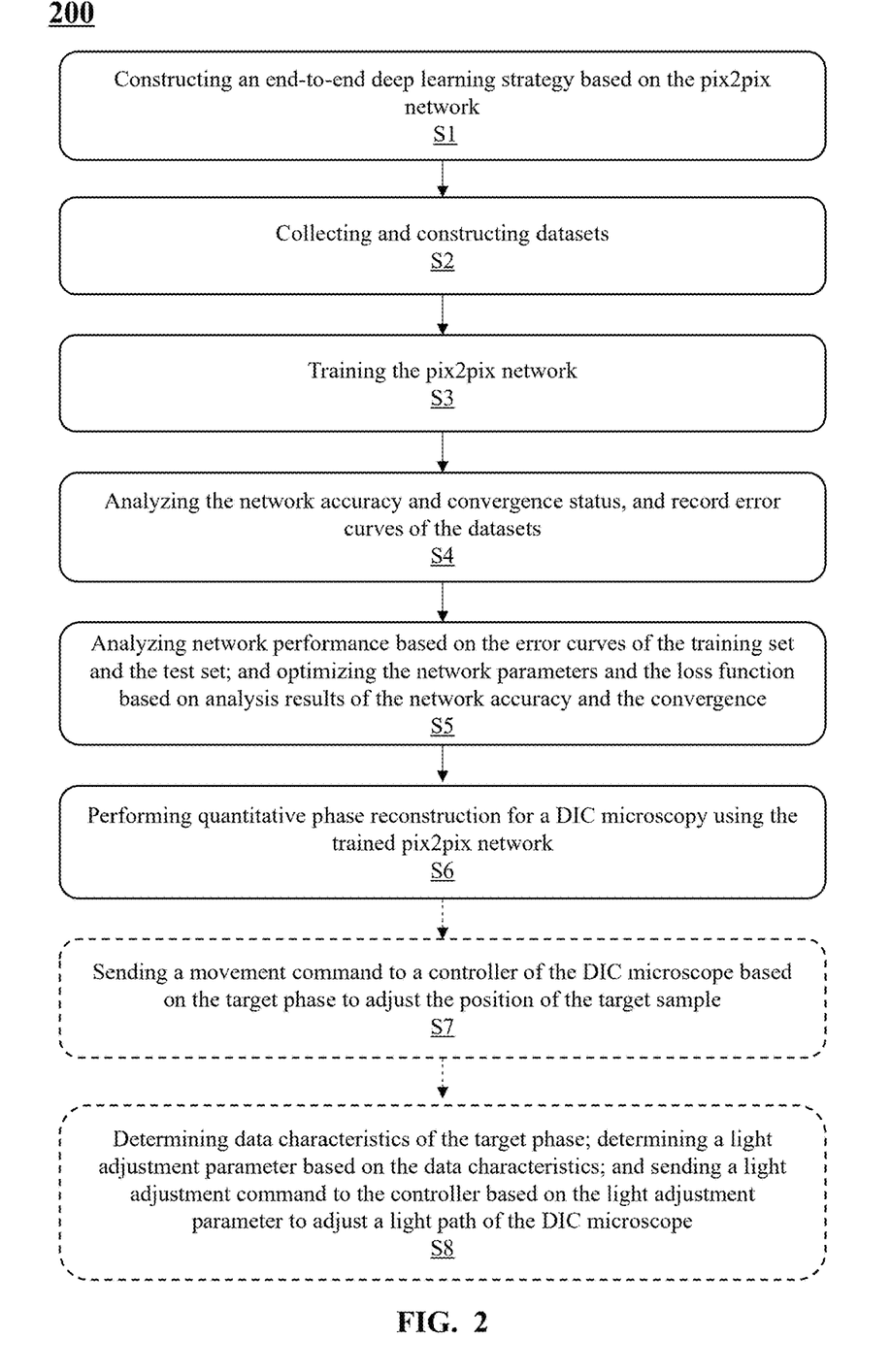
FIG. 2 is a flowchart of an exemplary process for phase reconstruction for DIC microscopy according to some embodiments of the present disclosure.

FIG. 2 is a flowchart of an exemplary process for phase reconstruction for DIC microscopy according to some embodiments of the present disclosure. In some embodiments, a process 200 may include steps S1 to S6, which are executed by a processing device.

S1, constructing an end-to-end deep learning strategy based on a pix2pix network.

The pix2pix network refers to an image transformation model. The pix2pix network may be a machine learning model. For example, the pix2pix network may be a generative adversarial network (GAN).

In some embodiments, the pix2pix network may include a generator and a discriminator.

The deep learning strategy refers to an end-to-end deep neural network modeling and training scheme constructed based on the pix2pix network.

The generator refers to a neural network submodule in the pix2pix network configured to output a predicted phase. For example, the generator may adopt a U-Net encoder-decoder architecture.

The discriminator refers to another neural network submodule in the pix2pix network configured to determine a validity of the predicted phase output by the generator. A determination result of the discriminator may serve as a part of an adversarial loss function and be fed back to the pix2pix network to achieve integrated phase reconstruction. For example, the discriminator may adopt a PatchGAN architecture.

In some embodiments, each of the generator and the discriminator includes an input channel and an output channel.

The input channel refers to a network input channel in the generator or the discriminator configured to receive input data. The output channel refers to a network output channel in the generator or the discriminator configured to output data.

Figure 5:
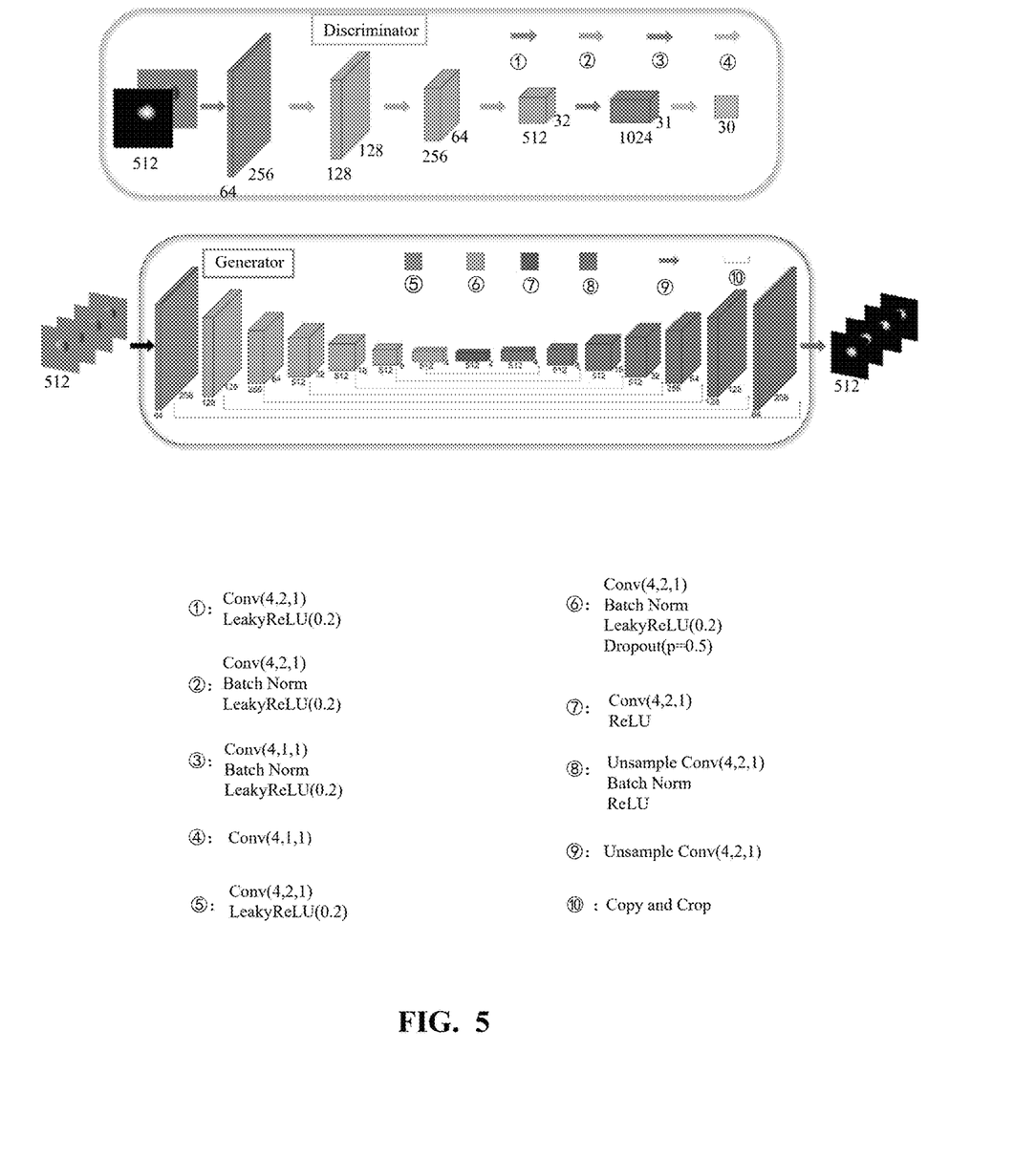
FIG. 5 is a schematic diagram illustrating a discriminator and a generator in a pix2pix network according to some embodiments of the present disclosure.

FIG. 5 is a schematic diagram illustrating a discriminator and a generator in a pix2pix network according to some embodiments of the present disclosure. As shown in FIG. 5, the generator adopts a U-Net encoder-decoder architecture, and an input is a differential phase. In the encoding stage, multiple convolutional layers and downsampling operations are used to progressively reduce the image size (e.g., from 512×512 to 2×512). In the decoding stage, deconvolution and upsampling operations are performed to gradually restore the image size. A skip connection mechanism is employed to supplement edge and local feature information. A predicted phase is finally output.

The discriminator adopts a PatchGAN architecture, and an input is an image pair (i.e., the differential phase and the predicted phases, or a ground-truth phase and the differential phase). A plurality of convolutional operations are used to compress the image, with the size progressively reduced (e.g., from 512×512 to 30×30). An output is a matrix of authenticity predictions for local regions, which is used to evaluate the validity of the predicted phase. The convolutional structures, activation functions (e.g., LeakyReLU), and normalization methods (e.g., BatchNorm) illustrated in FIG. 5 are all modules in a deep neural network.

In some embodiments, the processing device may perform supervised training based on the generator and the discriminator of the pix2pix network using a plurality of training samples with training labels, so as to construct an end-to-end deep learning strategy based on the pix2pix network.

S2: collecting and constructing datasets. Specifically, based on phase shifts with an equal-step and a fixed-step, digital holographic phase-shift interferograms of 5,000 groups of samples including Hela cells and polystyrene microspheres are collected to generate ground-truth phases for network training, and differential phases are determined based on a preset shear amount and a preset shear direction; the 5,000 groups of datasets including the differential phases and the ground-truth phases are constructed, wherein 4,000 groups of datasets are used as a training set for network training, and 1,000 groups of datasets are used as a test set for network testing; the differential phases serve as inputs, and the ground-truth phases serve as labels.

The digital holographic phase-shift interferogram of a group of sample refers to a set of four DIC images of the sample collected under a plurality of preset phase shifts through setting up an off-axis Mach-Zehnder digital holographic interferometry optical path. The digital holographic phase-shift interferogram may be used for subsequent phase reconstruction and training sample construction.

A group of samples (also referred to as a sample for brevity) refers to a physical experimental sample. For example, the sample may be an observation object composed of experimental materials such as Hela cells and polystyrene microspheres. Technical personnel may collect the digital holographic phase-shift interferograms of a total of 5,000 groups of samples including the HeLa cells and the polystyrene microspheres by imaging different glass slides or different field-of-view regions of the samples using the DIC microscope according to experimental requirements. For ease of description, the sample is also referred to as an experimental sample.

In some embodiments, the processor may collect the digital holographic phase-shift interferograms in various ways. For example, the processing device may collect the digital holographic phase-shift interferograms of 5,000 groups of samples including the HeLa cells and the polystyrene microspheres based on the phase shifts with an equal-step and a fixed-step. The phase shifts with the equal-step and the fixed-step refer to that phase variations between adjacent image acquisitions are identical and fixed.

In some embodiments, the processing device may collect four DIC images for each group of samples by setting up an off-axis Mach-Zehnder digital holographic interferometry optical path and sequentially setting phase shifts to 0, $\pi/2$, $\pi$, and $3\pi/2$. The four DIC images constitute one set of digital holographic phase-shift interferograms. The processing device may sequentially collect the digital holographic phase-shift interferograms of 5,000 groups of samples. Each of the four DIC images corresponds to one phase shift.

In some embodiments of the present disclosure, by setting up an off-axis Mach-Zehnder digital holographic interferometry optical path and setting the phase shifts to 0, $\pi/2$, $\pi$, and $3\pi/2$, the digital holographic phase-shift interferograms may be stably obtained, thereby effectively improving the accuracy and noise robustness of subsequent phase reconstruction and providing higher-quality training samples for the pix2pix network.

The ground-truth phase is configured to represent a phase distribution of a sample under an ideal condition. As used herein, a phase may be expressed in the form of an image, referred to as a phase map. For example, the ground-truth phase may also be referred to as a ground-truth phase map. For ease of description, the terms "phase" and "phase map" are used interchangeably in the present disclosure unless otherwise indicated or obvious from the context.

The differential phase refers to a difference image obtained by translating the ground-truth phase, and is configured to characterize a local variation trend of the truth phase. The differential phase may be expressed in the form of an image, referred to as a differential phase map.

In some embodiments, the processing device may obtain a differential phase in various ways. For example, the differential phase may be determined by performing a differential calculation on the ground-truth phase according to a preset shear amount and a preset shear direction. The shear amount and the shear direction may be preset by technical personnel according to practical requirements.

In some embodiments, the processing device may obtain sample phases from the digital holographic phase-shift interferograms corresponding to the phase shifts of 0, $\pi/2$, $\pi$, and $3\pi/2$ using a four-step phase-shifting algorithm. Based on the sample phases and computationally generated background phases, ground-truth phases may be determined. A differential phase may be obtained by shifting the ground-truth phases using a Fourier transform-based subpixel image displacement method.

The sample phase refers to a reference phase of a sample. The sample phase may also be expressed in the form of an image, referred to as a sample phase map.

In some embodiments, for each sample, the processing device may collect the digital holographic phase-shift interferograms with the phase shifts set to 0, $\pi/2$, $\pi$, and $3\pi/2$, and process the digital holographic phase-shift interferograms using the four-step phase-shifting algorithm to obtain the sample phase corresponding to the sample. The generated sample phase contains a background phase of the experiment, which refers to phase information in the sample phase that is related to background interference components. For example, the background phase of the experiment may include phase interference introduced by phase-shift deviation, interference fringe artifacts, and the like.

The computationally generated background phase refers to phase information generated through data simulation using a computer. In some embodiments, the processing device may randomly generate image details of the computationally generated background phase such that an overall noise level of the computationally generated background phase is consistent with a DIC optical path noise level, so as to ensure that a subsequently constructed dataset more closely resembles a phase distribution of a real DIC image.

In some embodiments, for each sample, the processing device may also determine the ground-truth phase based on the sample phase and the computationally generated background phase. Specifically, the processing device may generate the ground-truth phase $\varphi(r)$ for network training by replacing the background phase of the experiment in the sample phase with a computationally generated background phase through a threshold segmentation method. The threshold segmentation method may be configured to identify valid sample regions from the sample phase and to mask or zero out background regions, such that the computationally generated background phase only applies to non-sample regions, thereby constructing the ground-truth phase with clear structure and a reasonable background.

In some embodiments, the processing device may shift the ground-truth phase using a Fourier transform-based subpixel image displacement method to obtain an image $\varphi(r+\delta r)$, and calculate a differential phase $\Delta\varphi(r)$ according to Equation (3):

$$\Delta\varphi(r)=\varphi(r+\delta r)-\varphi(r), \quad (3)$$

where $\Delta\varphi(r)$ is the differential phase, $\varphi(r)$ is the ground-truth phase, $\delta r$ is a spatial displacement, r is a spatial coordinate point and may be expressed as (x, y), and $\varphi(r+\delta r)$ is an image obtained by shifting the ground-truth phase by $\delta r$. The spatial displacement $\delta r$ of the ground-truth phase may be preset to maintain consistency with a shear distance of the DIC microscope. In some embodiments, the processing device may determine the shear distance based on a displacement of a polarization prism in the DIC microscope, and use the shear distance as the spatial displacement of the ground-truth phase to shift the ground-truth phase and obtain the differential phase, thereby ensuring that a subsequently constructed dataset including the differential phase and the ground-truth phase is consistent with the shear distance of the DIC microscope.

In some embodiments of the present disclosure, the ground-truth phase is generated based on the sample phase and the computationally generated background phase, such that the phases used for training are closer to the actual imaging characteristics of DIC, thereby improving the authenticity and robustness of network training sample data. Meanwhile, by maintaining consistency between the spatial displacement of the ground-truth phase and the shear distance of the DIC microscope, the constructed differential phase better conforms to the actual physical model, enabling the subsequently constructed dataset to be more accurate, and facilitating the improvement of the network's generalization capability and phase reconstruction accuracy in practical applications.

In some embodiments, the processing device may construct datasets for training and testing based on the plurality of differential phases and corresponding ground-truth phases. Specifically, the processing device may collect digital holographic phase-shift interferograms of 5,000 groups of samples to generate corresponding sample phases. For each group of sample phases, the corresponding ground-truth phase and differential phase may be determined, so as to construct 5,000 groups of datasets, each of which includes the differential phase and the corresponding ground-truth phase. Among them, 4,000 groups of datasets are used for network training as a training set, and 1,000 groups of datasets are used for network testing as a test set. The generation methods for the ground-truth phases and the differential phases have been described in detail in the foregoing description of the present disclosure and are not repeated herein.

S3, training the pix2pix network. Specifically, the differential phases Δφ(r) in the training set are used as inputs, and the ground-truth phases φ(r) in the training set are used as labels. During a network training process, a loss function combining an adversarial loss and a similarity loss is used to determine a difference between a network output and its corresponding label, and gradient descent is employed to optimize network parameters.

In some embodiments, an input to the generator in the pix2pix network may include the differential phase Δφ(r) corresponding to a sample, and the network output of the generator may include the predicted phase. The input to the discriminator may include one or more image pairs, and an output may be used to determine the authenticity of images in the image pair(s). In some embodiments, the image pair(s) may be formed by combining the differential phase with the ground-truth phase or the predicted phase, respectively. For example, the image pairs may include a pair c including the differential phase and the ground-truth phase, and a pair including the differential phase and the predicted phase.

Figure 4:
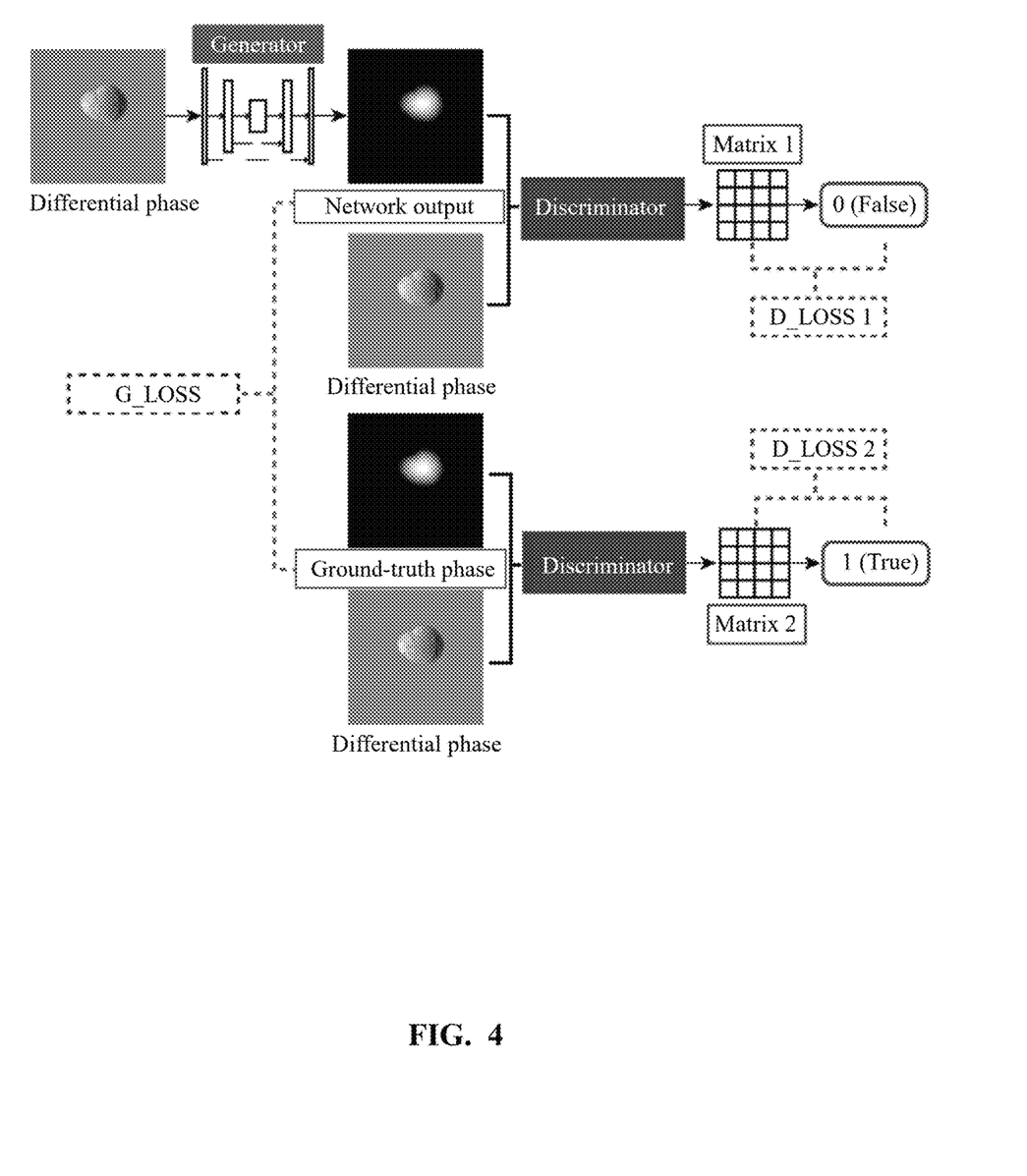
FIG. 4 is a schematic diagram illustrating an end-to-end deep learning strategy based on a pix2pix network according to some embodiments of the present disclosure.

FIG. 4 is a schematic diagram illustrating an end-to-end deep learning strategy based on a pix2pix network according to some embodiments of the present disclosure. As shown in FIG. 4, the differential phase may serve as a network input and be input to the generator to obtain a network output (i.e., a predicted phase). The predicted phase and the differential phase may form an image pair, which is input to the discriminator to determine the authenticity of the predicted phase and/or the differential phase. For example, the discriminator may output a probability that the predicted phase is real data. Meanwhile, the ground-truth phase and the differential phase may also form an image pair, which is input to the discriminator to determine the authenticity of the ground-truth phase and/or the differential phase. For example, the discriminator may output a probability that the ground-truth phase is real data.

In some embodiments, the processing device may perform the following training process to train the pix2pix network. The training process comprises: obtaining a plurality of training samples with labels (i.e., differential phases) to construct the training set, and performing multiple iterations based on the training set. At least one iteration comprises: selecting one or more training samples from the training set, inputting the one or more training samples into an initial pix2pix network to obtain one or more network outputs corresponding to the training samples (i.e., predicted phases); substituting the network outputs and the corresponding labels (i.e., ground-truth phases) into a predefined loss function to calculate differences between the network outputs and the labels; and iteratively updating model parameters of the initial pix2pix network based on the value computed from the loss function. When an iteration termination condition is met, the iteration is stopped, and a trained pix2pix network is obtained. The model parameters of the initial pix2pix network may be updated using various methods, for example, gradient descent. The iteration termination condition may include that the loss function converges or reaches a preset iteration threshold.

Figure 3:
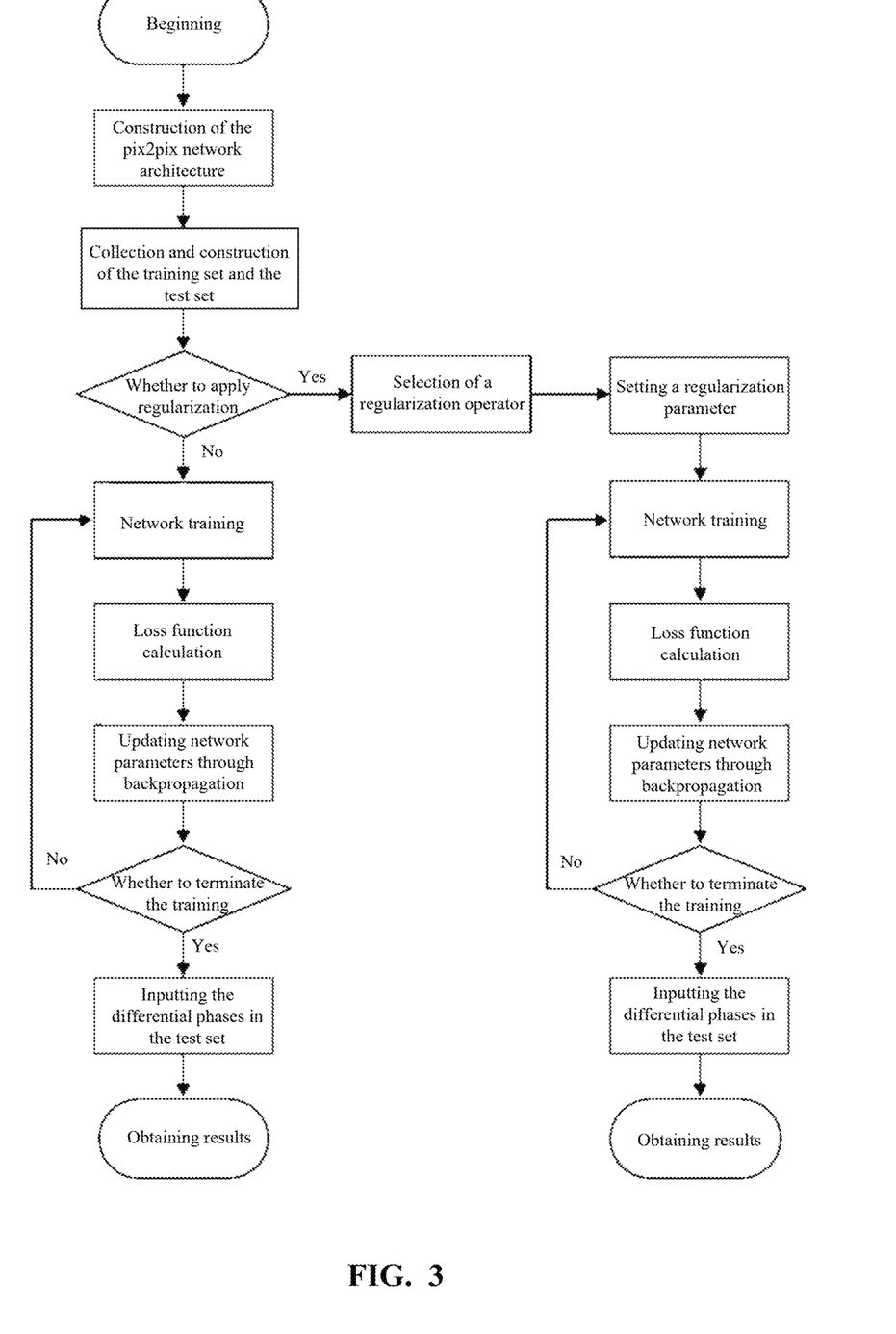
FIG. 3 is a schematic diagram illustrating a network training process according to some embodiments of the present disclosure.

FIG. 3 is a schematic diagram illustrating a network training process according to some embodiments of the present disclosure. As shown in FIG. 3, the training process may include steps such as construction of the pix2pix network structure, collection and construction of the training set and the test set, network training, loss function calculation, optimization of network parameters (via backpropagation), convergence determination, and inputting differential phases from the test set. During the training phase, regularization may optionally be introduced to further improve the convergence capability and prediction accuracy of the network. If regularization is enabled, an appropriate regularization operator may be selected and the corresponding regularization parameter may be configured to dynamically adjust the learning behavior of the pix2pix network. After the training is completed, the differential phases in the test set may be input for test verification to evaluate the generalization accuracy of the pix2pix network.

Figure 6:
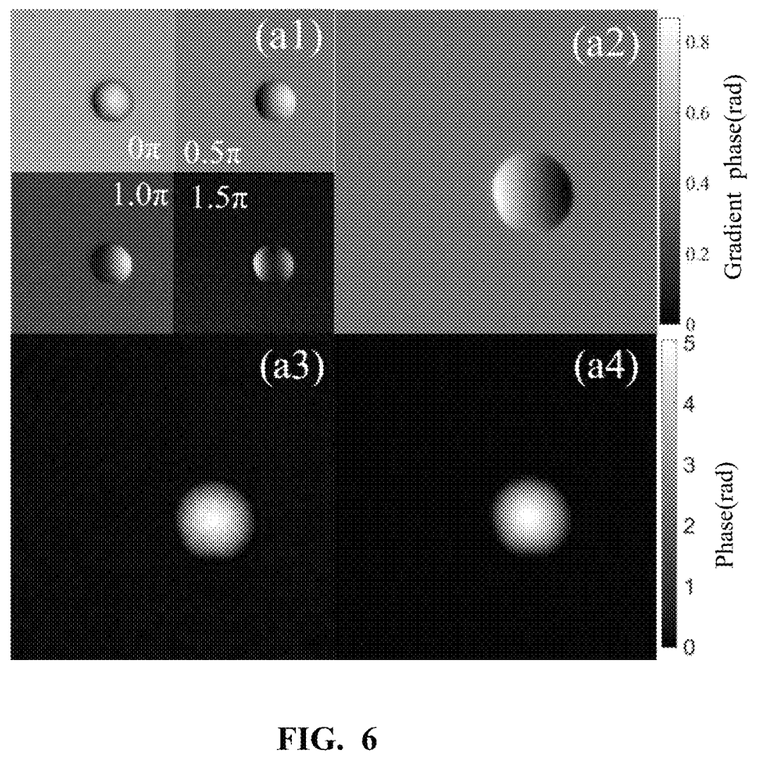
FIG. 6 is a schematic diagram illustrating DIC images, differential phases, ground-truth phases, and target phases according to some embodiments of the present disclosure.

FIG. 6 is a schematic diagram illustrating DIC images, differential phases, ground-truth phases, and predicted phases according to some embodiments of the present disclosure. As shown in FIG. 6, image (a1) shows four DIC images acquired by a DIC microscope with different phase shifts (0, π/2, π, and 3π/2); image (a2) shows a differential phase calculated from image (a1) using a four-step phase-shifting algorithm; image (a3) shows a ground-truth phase reconstructed using a digital holographic optical path, which serves as a training label; image (a4) shows a predicted phase obtained by the trained pix2pix network. A comparison between image (a3) and image (a4) shows that the predicted phase generated by the trained pix2pix network contains fewer artifacts, better edge smoothness, and stronger detail preservation capability, which verifies that the phase reconstruction method for DIC microscopy provided in the present disclosure exhibits strong robustness and prediction accuracy under complex interference noise conditions, and is applicable to high-precision phase reconstruction tasks.

Figure 7:
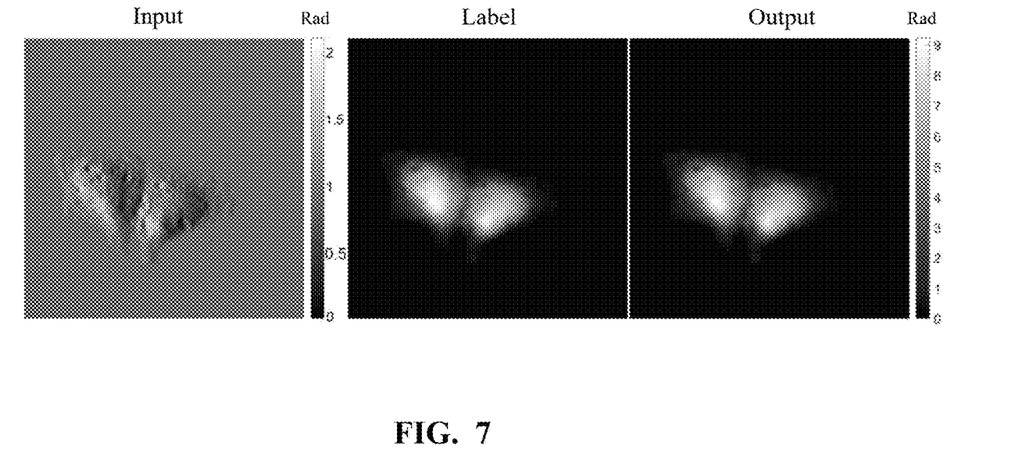
FIG. 7 is a schematic diagram illustrating differential phases (input), ground-truth phases (label), and predicted phases (output) according to some embodiments of the present disclosure.

FIG. 7 is a schematic diagram illustrating a differential phase (input), a ground-truth phase (label), and a predicted phase (output) according to some embodiments of the present disclosure. As shown in FIG. 7, the images from left to right are the input image in the training process (i.e., the differential phase), the label (i.e., the ground-truth phase), and the network output image (i.e., the predicted phase), respectively.

In some embodiments, a training objective (i.e., a loss function) may be represented by Equation (4):

$$L^* = \arg\min_G \max_D L_{cGAN}(G, D) + \lambda L_{L2}(G), \tag{4}$$

where $L^*$ represents the loss function, G represents the generator, D represents the discriminator, $L_{cGAN}(G, D)$ represents the adversarial loss, $L_{L2}(G)$ represents the similarity loss, and $\lambda$ is a regularization parameter set to 100.

The adversarial loss $L_{cGAN}(G, D)$ may be represented by Equation (5):

$$L_{cGAN}(G,D)=E_{x,y}[\log D(x,y)]+E_x[1-\log D(x,G(x))] \tag{5}$$

where E denotes an expected value, x denotes the inputted differential phase, y denotes the training label (i.e., the ground-truth phase), and G(x) denotes the output of the generator (i.e., the predicted phase); D(x, y) denotes a probability that the ground-truth phase is judged as real, that is, the probability output by the discriminator when the discriminator receives the ground-truth phase y and the differential phase x as the input; D(x, G(x)) denotes a probability that the predicted phase is judged as real, that is, the probability output by the discriminator when the predicted phase G(x) and the differential phase x are input into the discriminator. y (i.e., the ground-truth phase) denotes the training label, and may also be referred to as an integrated label phase and have an integral correspondence with the differential phase x in Equation (5).

The similarity loss $L_{L2}(G)$ may be represented by Equation (6):

$$L_{L2}(G)=E_{x,y}[\|y-G(x)\|_2] \quad (6)$$

where $L_{L2}(G)$ denotes the similarity loss function defined based on the L2 norm, which is used to measure the difference between the output of the generator and the integrated label phase y. Since the integrated label phase typically exhibits continuity, the similarity loss function $L_{L2}(G)$ is configured to enhance the constraint on the generator output, thereby improving the accuracy of the predicted phase and the stability of network training.

See FIG. 4, $E_x[1-\log D(x, G(x))]$ corresponds to D_LOSS1, $E_{x,y}[\log D(x, y)]$ corresponds to D_LOSS2, and $L_{L2}(G)$ corresponds to G_LOSS.

In some embodiments of the present disclosure, different from the commonly used L1 loss function in the Pix2Pix architecture, an L2 norm is utilized. The introduction of the L2 loss function enables effective constraint of the generator's output while maintaining training stability. The L2 loss function is suitable for image reconstruction tasks with strong spatial continuity, thereby allowing the predicted phase to better approximate the ground-truth phase. In addition, in Equation (5), by maximizing the discriminator's judgment probability for the ground-truth phase, i.e., log D (x, y), and simultaneously minimizing the judgment probability for the predicted phase, i.e., 1−log D (x, G(x)), the generator G is guided to produce a predicted phase closer to the ground-truth phase. The structure constitutes an adversarial game mechanism between the generator and the discriminator, where the two probability values reflect the discriminator's ability to distinguish between the ground-truth phase and the predicted phase, and are used to evaluate the difference between the generated result and the real data. By incorporating adversarial training, the network's capability to pix2pix network detailed structures and sample distributions may be enhanced, thereby further improving the fidelity and realism of the predicted phase.

In some embodiments, the processing device may determine training sample features based on the training set and determine an initial value of the regularization parameter based on the training sample features.

In some embodiments, the training sample features may include parameters such as a sample complexity, a sample noise level, and the shear distance, which are used to assist in setting the initial value of the regularization parameter during the network training process. The sample complexity is used to measure the complexity of the differential phases. For example, the sample complexity may be represented by characteristics such as the gradient variation range of the differential phases, the texture density, or the complexity of frequency-domain features. The sample noise level may represent the degree of noise interference in the differential phases.

In some embodiments, the processing device may determine the training sample features based on the training set. The sample complexity may be determined based on the amplitude distribution of the differential phases. Specifically, the processing device may perform amplitude statistics on the differential phases in the training set to determine an amplitude distribution, where an amplitude refers to the pixel absolute value in a differential phase. Based on the amplitude distribution, the processing device may calculate a difference between a maximum value and a minimum value of the amplitudes to determine a gradient range of the differential phases, and further calculate an average of the pixel absolute values as an average gradient intensity. The gradient range and the average gradient intensity are used as indicators for evaluating the sample complexity.

The sample noise level may be determined based on a noise level of the DIC optical path. Specifically, the DIC optical path is used to acquire experimental data with a plurality of differential phases and statistical analysis is performed on the experimental data to evaluate a background interference intensity within the differential phases. For example, a noise level of the differential phases may be determined based on indicators such as a standard deviation of pixel values, an amplitude range, or a spatial frequency spectrum of the experimental data, and be used as the sample noise.

The shear distance may be determined based on structural parameters of a polarization prism in the DIC microscope. For example, the shear distance may be determined based on a displacement of the polarization prism of the DIC microscope.

In some embodiments, the processing device may determine an initial value of the regularization parameter based on the training sample features and a first vector database. The first vector database may include a plurality of first feature vectors and first labels corresponding to the first feature vectors. Each first feature vector may be constructed from historical data based on a corresponding historical complexity, a historical noise level, and a historical shear distance. The first label corresponding to a first feature vector may represent the initial value of the regularization parameter used by the pix2pix network when a preset training performance is achieved in the historical data. The preset training performance refers to that the pix2pix network reaches a preset accuracy within a training time less than a preset time threshold. The preset accuracy and the preset time threshold may be preset manually based on prior knowledge.

The historical data may include historical differential phases acquired during historical observations using the DIC microscope. In some other embodiments, the first labels may be manually annotated by a person skilled in the art based on training performance.

The processing device may construct a first target vector based on the current training sample features, and determine one or more first feature vectors in the first vector database whose first similarity with the first target vector is greater than a preset similarity threshold. An average value of first labels corresponding to the one or more first feature vectors may be calculated and determined as an initial value of the regularization parameter corresponding to the first target vector. The similarity may be represented by a cosine similarity, a Euclidean distance, or the like.

In some embodiments of the present disclosure, determining the initial value of the regularization parameter based on the training sample features allows the regularization strength to be adaptively configured for different training samples. This avoids overfitting caused by a uniform regularization parameter setting or underfitting for simple samples. Meanwhile, the determined initial value of the regularization parameter is adapted to the distribution characteristics of the training samples, which helps reduce fluctuations in parameter tuning, accelerates convergence in the early stage of training the pix2pix network, and further improves the overall training efficiency and stability.

In some embodiments, the training of the pix2pix network comprises multiple iterations, wherein each current iteration includes the following operations. The processing device may select one or more training samples (i.e., differential phases) from the training set, input each training sample into the pix2pix network corresponding to the current iteration to obtain a predicted phase; determine a first value of the adversarial loss and a second value of the similarity loss based on the predicted phase and the label corresponding to each training sample (i.e., the ground-truth phase); determine an updated value of the regularization parameter based on the ratio between the first value and the second value and a current training phase; update the regularization parameter for the current iteration based on the updated value of regularization parameter and use it for the next iteration until the network training process is completed.

The first value refers to a value of the adversarial loss function in the current iteration. The second value refers to a value of the similarity loss function in the current iteration.

The training process of the pix2pix network may be divided into different stages as the number of training iterations progresses. The current training phase refers to a stage in which the current iteration is located during the training process. For example, the processing device may determine whether the current iteration is in an early stage (e.g., a ratio in a range of 0%-30%), a middle stage (e.g., a ratio in a range of 30%-70%), or a late stage (e.g., a ratio in a range of 70%-100%) based on a ratio between the current iteration count and a total number of iterations.

In some embodiments, the processing device may determine an updated value of the regularization parameter by querying a lookup table based on the ratio between the first value and the second value and the current training phase. The lookup table may indicate a correspondence between the ratio, the training phase, and a reference value of the regularization parameter. The processing device may use the reference value of the regularization parameter in the lookup table as the updated value of the regularization parameter.

The lookup table may be preconstructed based on historical data or prior knowledge. For example, in the historical data, when the pix2pix network achieves a preset accuracy within a training time that is less than a preset time threshold, the processing device may record a ratio between the first value and the second value in each iteration, a training phase, and a current value of the regularization parameter (which may be used as the reference value of the regularization parameter), and use the above data as a basis for constructing the lookup table.

In some embodiments, if the current training phase is in the early or middle stage and the first value is significantly greater than the second value, the processing device may determine an updated value of the regularization parameter by querying a lookup table, so as to enhance the constraint ability of the pix2pix network on similarity features and prevent the generator from overfitting the objective of the discriminator at the early or middle stage. In addition, if a drastic fluctuation of the second value occurs during the training process (e.g., a fluctuation amplitude of the second value exceeds a preset variation threshold for multiple consecutive iterations), the processing device may determine the updated value of the regularization parameter by querying the lookup table based on the ratio between the first value and the second value and the current training phase. This helps balance the training objectives, stabilize the variation of the loss gradient, and improve the overall training stability of the pix2pix network.

In some embodiments of the present disclosure, compared with using a fixed regularization parameter, dynamically adjusting the regularization parameter based on the training phase and the ratio between the first value and the second value can improve training efficiency and accuracy. During the training of the pix2pix network, when the adversarial loss becomes dominant, the regularization constraint is automatically strengthened to avoid the generator from overfitting the adversarial training objective. If an abnormal fluctuation of the similarity loss occurs during the training process, the direction of optimization between the two loss terms may be balanced through dynamic adjustment of the regularization parameter, thereby stabilizing gradient updates and preventing the generator from falling into a local optimum. This facilitates improving the convergence speed and overall performance of the pix2pix network, and enhances the stability and adaptability of the pix2pix network.

S4: analyzing the network accuracy and convergence status, and recording error curves of the datasets.

The ability of the pix2pix network to generate accurate phase reconstruction maps is improved through network training, wherein a goal of the network training process is to make the loss function converge, and the network parameters or an architecture of the pix2pix network are adjusted when the loss function does not converge during the network training process. For example, the processing device may dynamically adjust the learning rate during the training process based on a variance of pixel values of the labels in the training set. When the variance is large, indicating that the differences among the samples are high and the training task is more difficult, the learning rate may be appropriately reduced. When the variance is small, indicating that the sample differences are minor and the training path is clearer, the learning rate may be increased to accelerate the convergence speed of the pix2pix network.

In addition, during the network training process, the training set and the test set are input alternately to record their error curves for analyzing network accuracy and convergence. For example, for each of the training set and the test set, the processing device may calculate an average error after each training iteration, and construct a corresponding error curve based on the average error and the corresponding iteration number. The horizontal axis of the error curve represents the iteration number, and a vertical axis represents the average error. The trend of the error curve may be used to analyze the convergence trend of the network training process, overfitting conditions, and the effectiveness of the deep learning strategy.

S5: analyzing network performance based on the error curves of the training set and the test set, and optimizing the network parameters and the loss function based on analysis results of the network accuracy and the convergence.

For example, the processing device may analyze the error curves of the training set and the test set. If errors of the training set (which is determined based on the error curve of the training set) has converged while errors of the test set (which is determined based on the error curve of the test set) remains high, there may be a risk of overfitting; in this case, the processing device may dynamically optimize the loss function by adjusting a regularization parameter between the adversarial loss and the similarity loss to rebalance the optimization direction of the generator, thereby improving the generalization capability of the pix2pix network.

In some embodiments, in response to determining that the errors of the training set and the test set are both low, the analysis result of the network performance is determined as moderate fitting, and the network parameters are retained; in response to determining that the errors of the training set and the test set are both high, the analysis result of the network performance is determined as underfitting, the number of convolutional layers in the generator is increased, the network parameters are adjusted, and the pix2pix network is retrained; in response to determining that the errors of the training set are low while the errors of the test set are high, the analysis result of the network performance is determined as overfitting, the datasets are expanded, and the pix2pix network is retrained.

The term "high" indicates that the errors exceed a preset error threshold, and the term "low" indicates that the errors do not exceed the preset error threshold. The preset error threshold may be determined in advance according to an actual application scenario. The processing device may reconstruct new datasets including the differential phases and the ground-truth phases to expand the datasets, and the number of data in the new datasets may be determined based on actual needs.

In some embodiments of the present disclosure, by analyzing the error curves of the training set and the test set, the network performance may be evaluated to determine the current fitting state of the pix2pix network, and the network architecture or the datasets may be dynamically adjusted to prevent overfitting of the pix2pix network. In particular, for a task of recovering the ground-truth phase from the differential phase, overfitting or underfitting conditions may be identified and corrected in a timely manner during the training process. For example, the number of convolutional layers in the generator may be increased, or the datasets may be expanded to enhance the representation capability and generalization capability of the network, thereby maintaining the performance of the pix2pix network in phase reconstruction.

S6, performing quantitative phase reconstruction for DIC microscopy using the trained pix2pix network.

Step S6 comprises acquiring target DIC images of a target sample using the DIC microscope with phase shifts of 0, $\pi/2$, $\pi$, and $3\pi/2$, quantitatively recovering a target differential phase $\Delta\varphi(r)'$ from the target DIC images based on a four-step phase-shifting algorithm, and inputting the recovered target differential phase $\Delta\varphi(r)'$ into the pix2pix network to obtain a target phase $\varphi(r)'$.

The target sample refers to a sample that requires quantitative phase reconstruction after the pix2pix network has been trained. The target DIC images refer to DIC images of the target sample acquired using the DIC microscope, and the acquisition method is similar to that of the DIC images used during network training. The target differential phase refers to the differential phase inputted into the pix2pix network during the application process, which is determined in a similar manner as the differential phase described in step S2. The target phase refers to the phase outputted by the pix2pix network during the application process.

In some embodiments, the process 200 further comprises S7 to S8.

S7, sending a movement command to a controller of the DIC microscope based on the target phase to adjust the position of the target sample. The movement command instructs the controller to control a stage of the DIC microscope to adjust the position of the target sample.

The position of the target sample refers to a position of the target sample in a preset coordinate system. The target sample is placed on the stage, and the position of the target sample may be adjusted by the stage.

In some embodiments, the processing device may send the movement command to the controller of the DIC microscope based on a difference between the target phase and a reference phase, to move the stage of the DIC microscope, thereby driving the target sample to move and adjusting the position of the target sample so that a region to be observed returns to a center of a field of view. The reference phase refers to a phase image acquired and reconstructed from the target sample using the DIC microscope after the network has been trained, and serves as an initial reference image of the target sample in the microscopic field of view.

In some embodiments, the processing device may set up an off-axis Mach-Zehnder digital holographic interferometry optical path, set the phase shifts to 0, $\pi/2$, $\pi$, and $3\pi/2$, collect digital holographic phase-shift interferograms of the target sample, and perform phase reconstruction based on the four-step phase-shifting algorithm to obtain the reference phase.

In some embodiments, the processing device may analyze an image difference between the target phase and the reference phase. Specifically, the processing device may calculate a cross-correlation function between the two phases to detect an offset between the images. For example, the cross-correlation function may be expressed by the following formula (7):

$$C(u,v)=\Sigma_{x,y}\emptyset_{ref}(x,y)\times\emptyset_{current}(x+u,y+v) \quad (7)$$

where $C(u, v)$ indicates a correlation value of the target phase relative to the reference phase at a horizontal displacement $u$ and a vertical displacement $v$ in an image plane, $\emptyset_{ref}$ denotes the reference phase, $\emptyset_{ref}(x, y)$ denotes a phase value of the reference phase at the position $(x, y)$, and $\emptyset_{current}(x+u, y+v)$ denotes a phase value of the target phase at the position $(x+u, y+v)$. The processing device may calculate cross-correlation values between the reference phase and the target phase at each displacement position to construct a two-dimensional cross-correlation matrix. A peak response position $(u_{max}, v_{max})$ may be determined by searching for a maximum value in the matrix, which represents a pixel displacement of the target phase relative to the reference phase.

In some embodiments, the processing device may convert the pixel displacement mentioned above into a displacement in the physical space based on a pre-established pixel-to-physical displacement mapping. The mapping may be obtained through calibration experiments of the DIC microscope and represents the actual spatial distance corresponding to one pixel.

In some embodiments, the processing device may generate the movement control command based on the physical displacement and transmit the command to the controller of the DIC microscope through a communication interface (e.g., RS-232, USB, or other API interfaces) to control the stage of the DIC microscope for adjusting the position of the target sample. The movement command may include a movement direction and a displacement distance of the target sample, where the displacement distance corresponds to the converted physical displacement derived from the peak position $(u_{max}, v_{max})$, and the movement direction is opposite to the pixel displacement direction of the target phase relative to the reference phase, i.e., the stage is controlled to move in the direction of $(-u_{max}, -v_{max})$, thereby moving the target sample and realigning it to the center of the field of view to ensure image continuity and stability.

In some embodiments of the present disclosure, after the phase reconstruction by the pix2pix network is completed, an automated control mechanism may be further introduced to generate the movement command for the target sample based on a difference between the target phase and the reference phase, and to drive the stage of the DIC microscope to perform position calibration, thereby forming a closed-loop image-control operation process. Meanwhile, the movement command may dynamically update the spatial position of the target sample in the field of view according to real-time image changes, ensuring that the observation region remains in an optimal imaging condition, and thereby enhancing the imaging precision, stability, and intelligence level of observation. The embodiments of the present disclosure are applicable to scenarios such as live-cell continuous observation, automatic scanning, and target region tracking, offering high practicality and application value.

S8, determining data characteristics of the target phase; determining a light adjustment parameter based on the data characteristics; and sending a light adjustment command to a controller based on the light adjustment parameter to adjust a light path of the DIC microscope. The light adjustment command instructs the controller to control a prism of the DIC microscope to adjust the light path of the DIC microscope.

The data characteristics of the target phase refer to features associated with the target phase. For example, the data characteristics of the target phase may include artifacts, gradient anomalies, or the like in the target phase.

In some embodiments, the processing device may determine data characteristics of the target phase using a first prediction model based on the target phase. The first prediction model may be a machine learning model. For example, the first prediction model may be a neural network (NN), etc. In some embodiments, an input to the first prediction model may include the target phase, and an output may include the data characteristics corresponding to the target phase.

First training samples for the first prediction model may include sample target phases. The first training label corresponding to each first training sample may be the data characteristics corresponding to the sample target phase. The first training samples may be determined based on historical data, and the first training labels corresponding to the first training samples may be obtained and labeled manually based on the historical data.

In some embodiments, the first prediction model may be obtained by training a first initial first prediction model using a plurality of first training samples with the first training labels. The processing device may perform a training process to obtain the first prediction model. The training process may include acquiring the first training samples with corresponding first training labels to form a training dataset, and performing multiple iterations based on the training dataset. At least one iteration may include: selecting one or more first training samples from the training dataset; inputting the one or more first training samples into an initial first prediction model to obtain corresponding network outputs; substituting the network outputs and the corresponding first training labels into a predefined loss function to calculate a value of the loss function; and iteratively updating model parameters of the initial first prediction model based on the value of the loss function until an iteration termination condition is satisfied, thereby obtaining the trained first prediction model. The model parameters of the initial first prediction model may be updated using various methods, such as gradient descent. The iteration termination condition may include that the loss function converges or reaches a preset iteration threshold.

The light adjustment parameter refers to a control parameter used to adjust a direction or angle of illumination light of the DIC microscope.

In some embodiments, the processing device may determine the light adjustment parameter using a second prediction model based on the data characteristics of the target phase.

The second prediction model may be a machine learning model. For example, the second prediction model may be a Neural Networks (NN), etc. In some embodiments, an input to the second prediction model may include an output of the first prediction model, and an output of the second prediction model may be the light adjustment parameter. The second training samples of the second prediction model may include the data characteristics corresponding to a sample target phase of a sample, and a second training label corresponding to each second training sample may be the light adjustment parameter of the sample. The second training samples may be determined based on historical data, and the second training labels may be obtained and labeled manually based on the historical data. For example, the historical data includes first historical data that includes artifacts or gradient anomalies collected by the DIC microscope before adjustment, and second historical data that includes artifacts or gradient anomalies collected by the DIC microscope after the light of the DIC microscope is adjusted using a sample light adjustment parameter. The sample light adjustment parameter serves as the second training label, and the data characteristics of the first historical data before the adjustment serve as the second training sample.

In some embodiments, the second prediction model may be obtained by training a second initial prediction model using a plurality of second training samples with second training labels. The training process of the second prediction model may be similar to that of the first prediction model and is therefore not described again herein.

In some embodiments, the processing device may send the light adjustment command to the controller based on the light adjustment parameter to control the polarization prism of the DIC microscope to adjust the light path of the DIC microscope. For example, the controller may control the polarization prism in the DIC microscope to perform a rotation operation based on the light adjustment command, thereby changing the propagation path or interference direction of the illumination light so that the direction of the light better matches the structure of the target sample, enhancing the phase contrast or the structural clarity.

In some embodiments of the present disclosure, by generating the light adjustment parameter and driving the controller to automatically adjust the direction of the illumination light of the microscope, the illumination condition can be adaptively matched based on the phase distribution of the target phase. As a result, the relationship between the incident light and the main texture direction of the target sample can be automatically optimized to enhance the phase contrast and the structural clarity, thereby significantly improving the quality of image reconstruction and increasing the automation and intelligence levels of the imaging process.

In some embodiments of the present disclosure, by constructing the datasets of ground-truth phases and differential phases and training a pix2pix network to learn the mapping from the differential phases to the corresponding predicted phase, high-precision and artifact-free phase reconstruction can be achieved, effectively overcoming the problems of accumulated errors and artifacts in traditional integration methods. Moreover, artifact-free reconstruction can be achieved based on the ground-truth phases and the differential phases obtained by shearing along a preset direction, thereby significantly enhancing the spatial phase sensitivity of the system and fully revealing fine details of the sample. In addition, the phase reconstruction method for DIC microscopy described in the present disclosure uses a simple device, features high computational efficiency and stable performance, and exhibits excellent noise resistance and strong robustness. Compared to traditional iterative reconstruction methods, the method of the present disclosure does not require the multiple iterations, thereby significantly improving the reconstruction speed and temporal resolution. It is suitable for practical deployment in high-precision DIC phase imaging tasks.

It should be noted that the foregoing description of the process 200 is intended to be exemplary and illustrative only and does not limit the scope of application of the present specification. For a person skilled in the art, various corrections and changes can be made to the process under the guidance of this specification. However, these corrections and changes remain within the scope of this specification.

The basic concepts have been described above, and it is apparent to those skilled in the art that the foregoing detailed disclosure serves only as an example and does not constitute a limitation of this specification. While not expressly stated herein, a person skilled in the art may make various modifications, improvements, and amendments to this specification. Those types of modifications, improvements, and amendments are suggested in this specification, so those types of modifications, improvements, and amendments are still within the spirit and scope of the exemplary embodiments of this specification.

Also, the specification uses specific words to describe embodiments of the specification, such as "an embodiment", "an embodiment", and/or "some embodiment" means a feature, structure, or characteristic associated with at least one embodiment of the present specification. Accordingly, it should be emphasized and noted that "one embodiment" or "an embodiment" or "an alternative embodiment" in different places in this specification do not necessarily refer to the same embodiment. In addition, certain features, structures, or characteristics in one or more embodiments of the present specification may be suitably combined.

Furthermore, unless expressly stated in the claims, the order of the processing elements and sequences, the use of numerical letters, or the use of other names as described in this specification are not intended to qualify the order of the processes and methods of this specification. While some embodiments of the invention that are currently considered useful are discussed in the foregoing disclosure by way of various examples, it is to be understood that such details serve only illustrative purposes and that additional claims are not limited to the disclosed embodiments!, rather, the claims are intended to cover all amendments and equivalent combinations that are consistent with the substance and scope of the embodiments of this specification. For example, although the implementation of various components described above may be embodied in a hardware device, it may also be implemented as a software only solution, e.g., an installation on an existing server or mobile device.

Similarly, it should be noted that in order to simplify the presentation of the disclosure of this specification, and thereby aid in the understanding of one or more embodiments of the invention, the foregoing descriptions of embodiments of this specification sometimes group multiple features together in a single embodiment, accompanying drawings, or a description thereof. description thereof. However, this method of disclosure does not imply that more features are required for the objects of the present specification than are mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately", "nearly", or "substantially".", "approximately", or "generally" is used in some examples. Unless otherwise noted, the terms "about," "approximate," or "approximately" indicates that a ±20% variation in the stated number is allowed. Correspondingly, in some embodiments, the numerical parameters used in the specification and claims are approximations, which can change depending on the desired characteristics of individual embodiments. In some embodiments, the numerical parameters should take into account the specified number of valid digits and utilize a general digit retention method. While the numerical domains and parameters used to confirm the breadth of their ranges in some embodiments of this specification are approximations, in specific embodiments such values are set to be as precise as possible within a feasible range.

For each patent, patent application, patent application disclosure, and other material cited in this specification, such as articles, books, manuals, publications, documents, etc., the entire contents of which are hereby incorporated by reference herein. Application history documents that are inconsistent with or conflict with the contents of this specification are excluded, as are documents (currently or hereafter appended to this specification) that limit the broadest scope of the claims of this specification. It should be noted that in the event of any inconsistency or conflict between the descriptions, definitions, and/or use of terms in the materials appended to this specification and those set forth herein, the descriptions, definitions and/or use of terms in this specification shall prevail. use shall prevail.

Finally, it should be understood that the embodiments described in this specification are only used to illustrate the principles of the embodiments of this specification. Other deformations may also fall within the scope of this specification. As such, alternative configurations of embodiments of the present specification may be viewed as consistent with the teachings of the present specification as an example, not as a limitation. Correspondingly, the embodiments of the present specification are not limited to the embodiments expressly presented and described herein.

What is claimed is:

1. A phase reconstruction method for differential interference contrast (DIC) microscopy based on a pix2pix network, comprising:
  S1: constructing an end-to-end deep learning strategy based on the pix2pix network, wherein the pix2pix network includes a generator and a discriminator, each of the generator and the discriminator includes an input channel and an output channel;
  S2: based on phase shifts with an equal-step and a fixed-step, collecting digital holographic phase-shift interferograms of 5,000 groups of samples including Hela cells and polystyrene microspheres to generate ground-truth phases for network training and determine differential phases based on a preset shear amount and a preset shear direction; constructing 5,000 groups of datasets including the differential phases and the ground-truth phases, wherein 4,000 groups of datasets are used as a training set for network training, and 1,000 groups of datasets are used as a test set for network testing, the differential phases serve as inputs, and the ground-truth phases serve as labels;

S3: training the pix2pix network, wherein the differential phases Δφ(r) in the training set are used as inputs, the ground-truth phases φ(r) in the training set are used as labels; during a network training process, a loss function combining an adversarial loss and a similarity loss is used to determine a difference between a network output and its corresponding label, and gradient descent is employed to optimize network parameters;

S4: improving the ability of the pix2pix network to generate accurate phase reconstruction maps through network training, wherein a goal of the network training process is to make the loss function converge, and the network parameters or an architecture of the pix2pix network are adjusted when the loss function does not converge during the network training process; during the network training process, the training set and the test set are input alternately to record their error curves for analyzing network accuracy and convergence;

S5: analyzing network performance based on the error curves of the training set and the test set; and optimizing the network parameters and the loss function based on analysis results of the network accuracy and the convergence;

S6: performing quantitative phase reconstruction for differential interference contrast microscopy using the trained pix2pix network, including acquiring DIC images with phase shifts of 0, π/2, π, and 3π/2 through a DIC microscope, quantitatively recovering a differential phase Δφ(r) from the DIC images using a four-step phase-shifting algorithm, and inputting the recovered differential phase Δφ(r) into the pix2pix network to obtain a sample phase φ(r);

S7: applying the trained pix2pix network to perform quantitative phase reconstruction for differential interference contrast microscopy.

2. The phase reconstruction method for DIC microscopy based on the pix2pix network of claim 1, wherein S2 comprises:

setting up an off-axis Mach-Zehnder digital holographic interferometry optical path, with the phase shifts set to 0, π/2, π, and 3π/2, to collect the digital holographic phase-shift interferograms of the 5,000 groups of samples.

3. The phase reconstruction method for DIC microscopy based on the pix2pix network of claim 2, wherein S2 comprises:

obtaining sample phases from the digital holographic phase-shift interferograms corresponding to the phase shifts of 0, π/2, π, and 3π/2 using the four-step phase-shifting algorithm;

generating the ground-truth phases φ(r) for network training by adding the sample phases to computationally generated background phases using a threshold segmentation method;

replacing background phases reconstructed from the digital holographic interferometry optical path with the computationally generated background phases to make the datasets closer to the phase distribution of real DIC images, wherein the computationally generated background phases are randomly generated with a noise level consistent with a DIC optical path noise level;

using a Fourier transform-based subpixel image displacement method to shift the ground-truth phases to images φ(r+δr), and calculating the differential phases δφ(r) using the following formula:

$$\Delta\varphi(r)=\varphi(r+\delta r)-\varphi(r)$$

where Δφ(r) is the differential phases, φ(r) is the ground-truth phases, δr is a spatial displacement, and φ(r+δr) is the images obtained by shifting the ground-truth phases by δr, the spatial displacement is correlated with a microscope shear distance of the DIC microscope to maintain consistency with the microscope shear distance.

4. The phase reconstruction method for DIC microscopy based on the pix2pix network of claim 3, wherein in S3, a training objective represented by the following formula is used:

$$L^* = \arg\min_G \max_D L_{cGAN}(G, D) + \lambda L_{L2}(G)$$

where G represents the generator, D represents the discriminator, $L_{cGAN}(G, D)$ represents the adversarial loss, $L_{L2}(G)$ represents the similarity loss, and λ is a regularization parameter set to 100;

the adversarial loss $L_{cGAN}(G, D)$ is expressed as:

$$L_{cGAN}(G,D)=E_{x,y}[\log D(x,y)]+E_x[1-\log D(x,G(x))]$$

where E denotes an expected value, x denotes the inputted differential phases, y denotes the ground truth phases, and G(x) denotes the network output of the generator, the generator and discriminator engage in adversarial training with the adversarial loss as an objective;

the similarity loss $L_{L2}(G)$ is expressed as:

$$L_{L2}(G)=E_{x,y}[\|y-G(x)\|_2]$$

where $L_{L2}$ denotes the L2 norm, configured to constrain the generator's output to approximate the ground truth phases when the integrated phase is continuous.

5. The phase reconstruction method for DIC microscopy based on the pix2pix network of claim 3, wherein S5 comprises:

in response to determining that errors of the training set and the test set are both low, determining that the analysis result of the network performance includes moderate fitting, and retaining the network parameters;

in response to determining that the errors of the training set and the test set are both high, determining that the analysis result of the network performance includes underfitting, increasing the number of convolutional layers in the generator, adjusting the network parameters, and retraining the pix2pix network;

in response to determining that the errors of the training set are low while the errors of the test set are high, determining that the analysis result of the network performance includes overfitting, expanding the datasets, and retraining the pix2pix network.

\* \* \* \* \*